United States Patent [19]

Browne-Wilkinson

[11] Patent Number: 6,074,214
[45] Date of Patent: Jun. 13, 2000

[54] SOFT ORGAN DEMONSTRATION AIDS

[76] Inventor: Oliver Browne-Wilkinson, 34 Newburgh Rd., London, W3 6DQ, United Kingdom

[21] Appl. No.: 09/129,123
[22] Filed: Aug. 4, 1998

[30] Foreign Application Priority Data

Aug. 4, 1997 [GB] United Kingdom .............. 9716413

[51] Int. Cl.⁷ ................................................. G09B 23/28
[52] U.S. Cl. ......................... 434/272; 434/262; 434/267; 446/92
[58] Field of Search .................... 434/262, 267, 434/268, 272, 273, 274, 269, 265, 260, 270; 446/92

[56] References Cited

U.S. PATENT DOCUMENTS

| | | | |
|---|---|---|---|
| 2,919,516 | 1/1960 | Schaefer | 446/92 |
| 3,090,155 | 5/1963 | Gordon | 446/92 |
| 3,106,786 | 10/1963 | Collins | 434/270 |
| 5,061,187 | 10/1991 | Jerath . | |
| 5,090,910 | 2/1992 | Narlo | 434/270 |

FOREIGN PATENT DOCUMENTS

| | | | |
|---|---|---|---|
| 466147 | 5/1936 | Sweden | 446/92 |
| 423200 | 9/1933 | United Kingdom | 446/92 |
| 2 236 005 | 3/1991 | United Kingdom . | |

OTHER PUBLICATIONS

Durolatex Models of Human Anatomy manufactured and for sale by Chicago Apparatus Company, Dec. 1939.

Primary Examiner—Robert A. Hafer
Assistant Examiner—Bena B. Miller
Attorney, Agent, or Firm—Young & Thompson

[57] ABSTRACT

A soft organ demonstration aid, such as a heart demonstration aid, is provided for demonstrating ultrasound or surgical techniques. The aid comprises a plurality of facsimile soft organ portions having joining surfaces and connected together in correct anatomical positions along a plurality of dividing planes by means of interengaging connecting members, such as magnets for example, on the joining surfaces. When all the portions are joined together, the aid mimics a whole soft organ, such as a human heart. Furthermore the portions are capable of being dismantled relative to one another along each of the dividing planes, in order to demonstrate a respective internal view of the organ corresponding to each plane. Thus the aid may be used to demonstrate the relative positions of internal features of the organ such as may be observed in ultrasonic scanning along different cross-sections of an actual organ, the views simulating the corresponding views obtained during actual scanning.

4 Claims, 2 Drawing Sheets

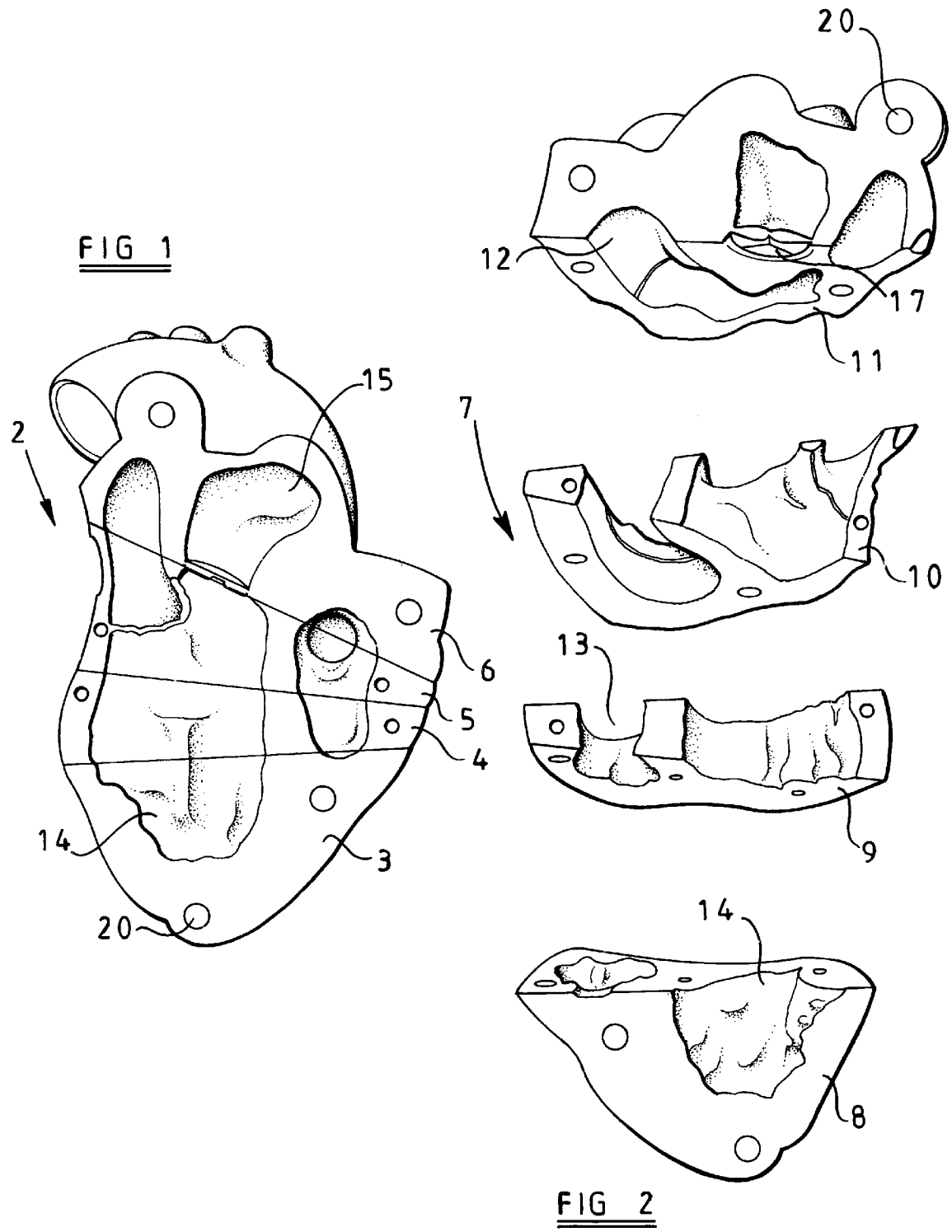

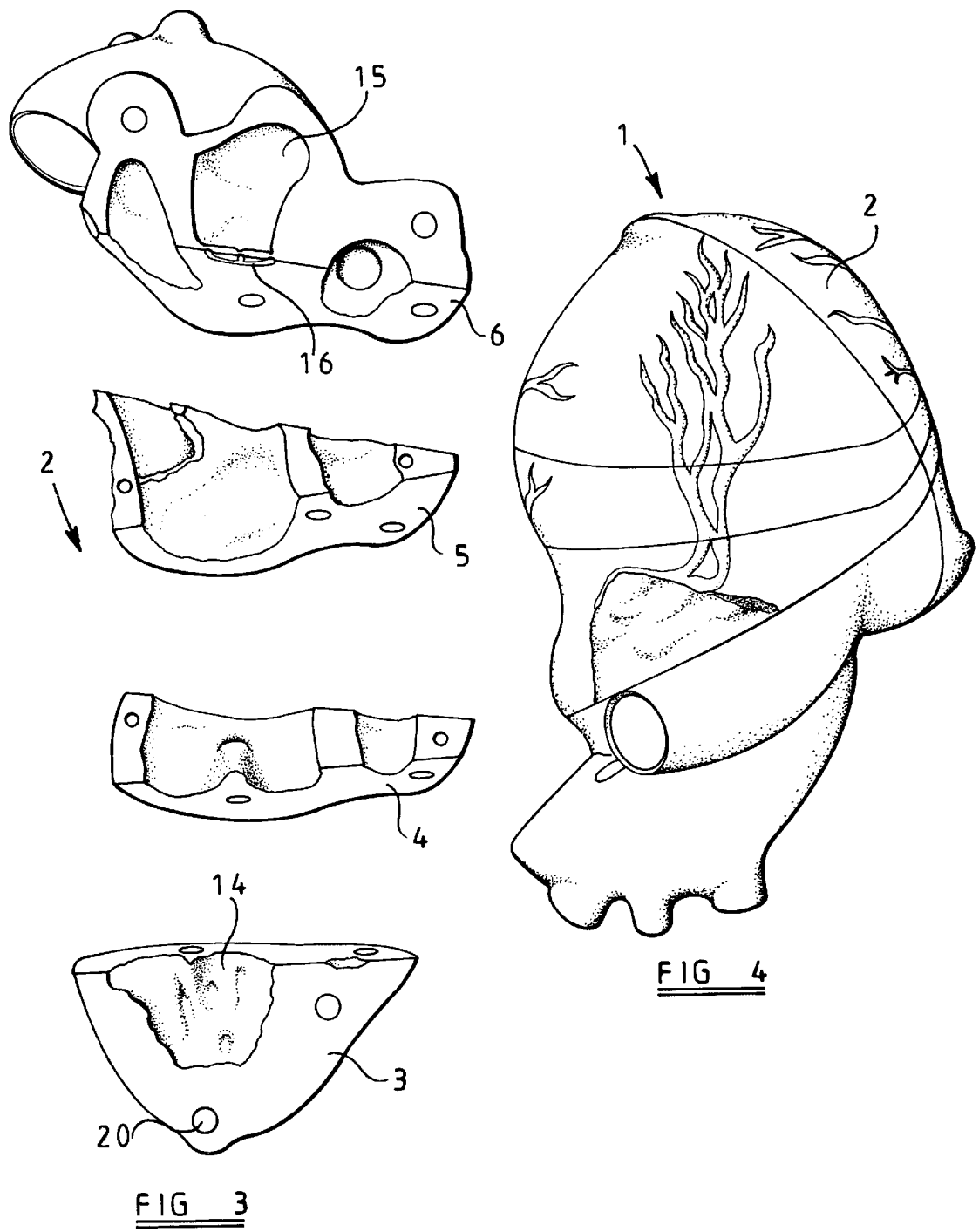

SOFT ORGAN DEMONSTRATION AIDS

This invention relates to soft organ demonstration aids, and is concerned more specifically, but not exclusively, with such aids for demonstrating ultrasound or surgical techniques.

It is known to produce various demonstrating or teaching aids mimicking parts of the human body in order to assist in teaching of anatomy and medical and surgical techniques. For example British Published Patent Application No. 2236005 discloses a three-dimensional model of a human brain stem comprising an assembly of facsimile portions mimicking features such as bone, cartilage, nerves and blood vessels, for use in teaching of anatomy. Furthermore U.S. Pat. No. 4,702,701 discloses a model of a portion of the human brain. Similarly French Patent No. 2550875 discloses a series of two-dimensional sections through the human brain.

Demonstration aids are also known for teaching medical ultrasound techniques. Such aids may simply mimic the form of the human anatomy in order to help students in interpreting results obtained when actually scanning a human body part, or alternatively may be designed to simulate the ultrasonic response characteristics of the internal human anatomy when the aid is itself ultrasonically scanned. An example of the latter type of demonstration aid is disclosed in U.S. Pat. No. 5,061,187 which discloses a simulated body cavity containing a number of elements simulating the ultrasonic response characteristics of the internal human anatomy including, for example, a simulated bladder in the form of a latex rubber balloon at least partially filled with water. However such a demonstration aid will provide only a coarse simulation of the actual ultrasonic response characteristics of the human anatomy, and is of no use in showing those internal features of human organs which are responsible for many of the features observed during ultrasonic scanning.

It is an object of the invention to provide a novel soft organ demonstration aid which is capable of being used for demonstrating various medical and surgical techniques, such as medical ultrasound techniques for example.

According to the present invention there is provided a soft organ demonstration aid for demonstration of techniques in relation to anatomical soft organs, the aid comprising a plurality of facsimile soft organ portions having joining surfaces and connected together in correct anatomical positions along a plurality of dividing planes by means of interengaging connecting members on the joining surfaces to mimic a whole soft organ, whereby the soft organ portions are dismantlable relative to one another along each of the dividing planes, to demonstrate an internal view of the soft organ corresponding to each dividing plane.

Such a soft organ demonstration aid can be taken apart along different dividing planes, at least two of which preferably intersect, in order to show the relative positions of internal features of the soft organ such as may be observed in ultrasonic scanning along different cross-sections of an actual organ, such as a human heart. The three-dimensional views of the internal features of the facsimile soft organ simulate the corresponding views obtained during ultrasonic scanning and thus assist students in the interpretation of such ultrasonic scanning views and in particular the significance of any features which differ from what would be expected in ultrasonic scanning of a normal healthy soft organ.

However such a soft organ demonstration aid may also be produced for other purposes, for example for demonstrating surgical techniques and in particular the locations of surgical incisions into the soft organ to enable surgery to be performed to extricate an abnormality or tumour. Such a demonstration aid is particularly suitable for demonstrating keyhole surgery techniques.

Preferably the soft organ portions are connected together by magnetic attraction This is particularly advantageous in allowing the aid to be quickly dismantled along one or more dividing planes to enable a three-dimensional view to be obtained which is similar to the view obtained in an actual organ.

Furthermore at least some of the interengaging connecting members may be in the form of a projection on one soft organ portion engaging within a recess in another soft organ portion. In certain cases it may not be necessary for all adjacent soft organ portions to be connected together by connecting members, although it is clearly advantageous that sufficient connecting members are provided to enable the whole aid to be held together in a stable manner when the various portions are connected together.

The connecting members are preferably respective magnets embedded within the adjacent soft organ portions. The magnets provided on adjacent connecting members are usually permanent magnets of complementary polarity such that the two magnets attract one another. However it is possible for some or all of the soft organ portions to be formed entirely of magnetic or magnetisable material. In this case one or more portions may be formed partly or wholly of permanently magnetic material, whereas one or more further portions may be formed partly or wholly of magnetisable material, such as iron for example.

Conveniently the connecting members are shaped or located so as to hold adjacent soft organ portions in the correct relative anatomical positions. To this end the connecting members may comprise complementary magnets and/or complementary projections and recesses. Most conveniently the connecting members for connecting together two adjacent soft organ portions along a dividing plane comprise at least two pairs of interengaging connecting members spaced apart along the dividing plane.

In order that the invention may be more fully understood, a heart demonstration aid in accordance with the invention will now be described, by way of example, with reference to the accompanying drawings in which:

FIG. 1 is a perspective view of the right-hand side heart portions of the aid fitted together;

FIG. 2 is a perspective view of the left-hand side heart portions dismantled from one another;

FIG. 3 is a perspective view of the right-hand side heart portions dismantled from one another; and FIG. 4 is a perspective view of all the heart portions fitted together.

The embodiment of the invention described below is a facsimile human heart for demonstrating ultrasound techniques, although it should be understood that a generally similar construction may be used for aids simulating other human organs subjected to ultrasound diagnosis, such as a kidney, a liver, a bowel, a stomach and a bladder for example. A similar demonstration aid may be used for simulating the soft organs of other animals.

Referring to the drawings the demonstration aid 1 mimicking the human heart consists of a right-hand side heart part 2 comprising four right-hand side heart portions 3, 4, 5 and 6 and a left-hand side heart part 7 comprising four left-hand side heart portions 8, 9, 10 and 11. The complete aid 1 is shown in FIG. 4 with the eight separable portions, that is the four portions of the right-hand heart part 2 and the four portions of the left-hand heart part 7, fitted together in their required relative anatomical positions. It will be appreciated that substantially only the right-hand heart part 2 is visible in this figure since the left-hand heart part 7 is below the right-hand heart part 2 in the view shown.

It will be appreciated that the form of the heart portions 5 is such as to mimic not only the external features of the heart, such as the connections to the aorta and pulmonary artery, but also the internal features of the heart, such as the right atrium 12, the right ventricle 13, the left ventricle 14 and the left atrium 15, as well as other internal features such as the mitral valve 16 and the aortic valve 17.

The various heart portions 3, 4, 5, 6, 8, 9, 10 and 11 are fitted together and located in the required relative anatomical positions by means of magnetic connecting members 20 in the form of small permanent magnets which are embedded in recesses in the portions and optionally bonded therein by adhesive. Adjacent portions are interengaged by complementary magnets of opposite polarity embedded within adjacent flat surfaces of the portions, two pairs of complementary magnets preferably being provided to ensure correct relative orientation of the portions when assembled together. However it should be stressed that, although it is preferred that each of the right-hand heart portions is connected to its adjacent right-hand heart portion by two such pairs of magnets and each of the left-hand heart portions is connected to its adjacent left-hand heart portion by two such pairs of magnets, it is possible for the left and right-hand heart parts to be connected together by a lesser number of pairs of magnets than the ideal case shown in the figures. In this case two connecting members are provided in each surface of each portion, that is, for example, two connecting members on the portion 3, two connecting members on the portion 4, two connecting members on the portion 5 and two connecting members on the portion 6.

Whilst, in the illustrated embodiment, all the connecting members are in the form of permanent magnets, it should be appreciated that other forms of connecting member may be used either on their own or in combination with other forms of magnetic or non-magnetic connecting member. Thus, for example, some or all of the magnetic connecting members shown may be replaced by mechanical connecting members, such as, for example, pins engaging within complementary recesses, adhesive pads and connecting members made of imagnetisable material, such as iron, which cooperate with magnetic connecting members. In a possible variant of the embodiment illustrated the connecting members are in the form of magnetic sheets bonded to the dividing surfaces and formed to have the same shape as the dividing surfaces so that adjacent portions are fitted together by the interengaging of magnetic sheets provided on their abutting surfaces In this and other embodiments, the relative locating of the portions may be assisted by means of interengaging projections and recesses.

It is a particular feature of the illustrated embodiment that the dividing surfaces are positioned so as to enable the aid to be taken apart along intersecting dividing planes corresponding to the sectioning planes of a particular type of ultrasound technique providing so-called "long and short access views". Thus this aid is capable of demonstrating the following three-dimensional views obtained in such an ultrasound technique:

1. The parasternal long access.
2. The parasternal short access—at the level of the great arteries.
3. The parasternal short access—at the level of the mitral valve.
4. The parasternal short access—at the level of the papillary muscle.

In alternative non-illustrated embodiments the intersecting dividing surfaces are positioned in the planes of other types of ultrasound technique referred to as the "four chamber views" and the "trans-oesophageal views".

Whilst the basic form of such embodiments is not intended to itself be subjected to ultrasound scanning or to simulate the ultrasonic response characteristics of the internal human anatomy (since substantially the whole of the aid is made from a homogenous material such as modelling plaster) it is also contemplated that, in a development of the invention, different parts of the aid will be made of different types of material so as to enable simulation of the ultrasonic response characteristics of the human heart when the aid is itself subjected to ultrasonic scanning. It is also contemplated that the aid may be made from flexible material so as to enable the anatomical distortions during pumping of the heart to be simulated by suitable flexing of the aid.

Finally it is contemplated that such an aid may be modelled using rapid prototyping techniques based on computer analysis of an actual organ, thus enabling an aid precisely mimicking the features of an actual organ to be produced rapidly for the purpose of diagnosis.

I claim:

1. A soft organ demonstration aid for demonstration of techniques in relation to anatomical soft organs, the aid comprising a plurality of facsimile soft organ portions having joining surfaces and connected together in correct anatomical positions along a plurality of dividing planes by means of interengaging connecting members on the joining surfaces to mimic a whole soft organ, wherein the soft organ portions are connected together by magnetic attraction, said interengaging connecting members comprising at least two pairs of interengaging magnetic means spaced apart along the dividing plane and providing said magnetic attraction, whereby the soft organ portions are dismantlable relative to one another along each of the dividing planes, to demonstrate an internal view of the soft organ corresponding to each dividing plane.

2. A demonstration aid according to claim 1, wherein the dividing planes are intersecting planes.

3. A demonstration aid according to claim 1, wherein the connecting members are separate magnets embedded within adjacent soft organ portions.

4. A demonstration aid according to claim 1, wherein the dividing planes are arranged to demonstrate three-dimensional anatomical views similar to those obtained when subjecting the soft organ to ultrasound scanning.

* * * * *